(12) United States Patent
Oyamada et al.

(10) Patent No.: US 8,977,094 B2
(45) Date of Patent: Mar. 10, 2015

(54) OPTICAL FIBER

(71) Applicant: Shin-Etsu Chemical Co., Ltd., Tokyo (JP)

(72) Inventors: Hiroshi Oyamada, Gunma (JP); Hitoshi Nakajima, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 15 days.

(21) Appl. No.: 13/859,757

(22) Filed: Apr. 10, 2013

(65) Prior Publication Data

US 2013/0272669 A1 Oct. 17, 2013

(30) Foreign Application Priority Data

Apr. 12, 2012 (JP) ................. 2012-091106

(51) Int. Cl.
*G02B 6/036* (2006.01)
*G02B 6/02* (2006.01)
*G02B 6/028* (2006.01)

(52) U.S. Cl.
CPC .......... *G02B 6/02042* (2013.01); *G02B 6/0283* (2013.01); *G02B 6/03644* (2013.01); *G02B 6/0365* (2013.01)
USPC ............................................. 385/126; 65/415

(58) Field of Classification Search
CPC ............. G02B 6/02042; G02B 6/0283; G02B 6/03644; G02B 6/0365
USPC ........... 385/126, 124, 127; 359/341.1; 65/415
See application file for complete search history.

(56) References Cited

U.S. PATENT DOCUMENTS

| | | | |
|---|---|---|---|
| 4,852,968 A | 8/1989 | Reed | |
| 8,385,701 B2 * | 2/2013 | Bookbinder et al. | 385/123 |
| 2006/0115224 A1 | 6/2006 | Kutami et al. | |
| 2011/0064368 A1 * | 3/2011 | Bookbinder et al. | 385/123 |
| 2011/0222824 A1 | 9/2011 | Nakanishi et al. | |

FOREIGN PATENT DOCUMENTS

| | | | | |
|---|---|---|---|---|
| EP | 2175295 A1 * | 4/2010 | | G02B 6/036 |
| WO | WO 2009104724 A1 * | 8/2009 | | |
| WO | WO 2011031612 A1 | 3/2011 | | |

OTHER PUBLICATIONS

Extended European Search Report for Application No. 13163496.6-1504, issued by the European Patent Office on May 28, 2013.
Office Action for Korean Patent Application No. 10-2013-0022179, issued by the Korean Intellectual Property Office on Jan. 20, 2014.

* cited by examiner

*Primary Examiner* — Peter Radkowski

(57) ABSTRACT

An optical fiber comprising a first core, a second core, a third core, and a cladding, wherein with a refractive index of the cladding as a reference, $\Delta 1$ is a maximum value of a relative refractive index difference of the first core, $\Delta 2$ is a maximum value of a relative refractive index difference of the second core, $\Delta 3$ is a minimum value of a relative refractive index difference of the third core, "a" is a half-value radial width for the relative refractive index difference ($\Delta 1 - \Delta 2$) of the first core, "b" is a radius of a second core/third core boundary, and "c" is a radius of a third core/cladding boundary, the expressions $0.30\% \leq \Delta 1 \leq 0.45\%$, $-0.05\% \leq \Delta 2 \leq 0.05\%$, $-0.6\% \leq \Delta 3 \leq -0.3\%$, $2.85 \leq b/a$, $10\ \mu m \leq b \leq 15\ \mu m$, and $3\ \mu m \leq c-b \leq 5.5\ \mu m$ are satisfied, and transmission loss for a wavelength of 1550 nm when the optical fiber is wound around a mandrel with a diameter of 10 mm is no greater than 0.2 dB/turn.

6 Claims, 10 Drawing Sheets

FIG. 2

| | MANUFACTURING PARAMETER | | | | | | | | OPTICAL CHARACTERISTIC | | | | | | |
|---|---|---|---|---|---|---|---|---|---|---|---|---|---|---|---|
| | $\Delta 1$ | $\Delta 2$ | $\Delta 3$ | a | b | c | b/a | c-b | TRANS- MISSION LOSS 1388nm | MFD | h/MFD | $\lambda_c$ | $\lambda_{cc}$ | $\lambda_c \sim \lambda_{cc}$ | CURVA- TURE LOSS 1550nm |
| | [%] | [%] | [%] | [μm] | [μm] | [μm] | [-] | [μm] | [dB/km] | [μm] | [-] | [nm] | [nm] | [nm] | [dB/t] |
| EMBODIMENT 1 | 0.375 | -0.057 | -0.547 | 3.95 | 11.88 | 15.06 | 3.01 | 4.18 | 0.301 | 8.83 | 1.34 | 1374 | 1251 | 123 | 0.066 |
| EMBODIMENT 2 | 0.333 | -0.013 | -0.550 | 4.16 | 11.88 | 15.49 | 2.85 | 3.61 | 0.342 | 8.92 | 1.33 | 1327 | 1241 | 86 | 0.137 |
| EMBODIMENT 3 | 0.374 | -0.025 | -0.608 | 3.85 | 11.40 | 15.00 | 2.96 | 3.60 | 0.315 | 8.31 | 1.37 | 1284 | 1224 | 60 | 0.111 |
| EMBODIMENT 4 | 0.380 | -0.015 | -0.525 | 3.62 | 11.94 | 15.75 | 3.30 | 4.81 | 0.323 | 8.60 | 1.39 | 1411 | 1256 | 155 | 0.058 |
| COMPARATIVE EXAMPLE 1 | 0.360 | -0.034 | -0.547 | 3.75 | 10.45 | 13.92 | 2.79 | 3.47 | 0.722 | 9.01 | 1.15 | 1282 | 1253 | 29 | 0.643 |
| COMPARATIVE EXAMPLE 2 | 0.402 | -0.013 | -0.537 | 3.49 | 10.47 | 16.06 | 3.00 | 5.59 | 0.666 | 8.65 | 1.25 | 1432 | 1247 | 185 | 0.041 |
| COMPARATIVE EXAMPLE 3 | 0.428 | -0.029 | -0.251 | 3.53 | 10.84 | 16.04 | 3.07 | 5.20 | 0.684 | 8.41 | 1.29 | 1243 | 1184 | 59 | 0.326 |

| EMBODIMENT | Δ1 [%] | Δ2 [%] | Δ3 [%] | a [μm] | b [μm] | c [μm] | b/a [-] | c-b [μm] | TRANSMISSION LOSS 1383nm [dB/km] | MFD [μm] | b/MFD [-] | λcc [nm] | CURVATURE LOSS (RADIUS 10 mm, WAVELENGTH 1550 nm) [dB/turn] |
|---|---|---|---|---|---|---|---|---|---|---|---|---|---|
| 5a | 0.25 | -0.06 | -0.60 | 5.8 | 14.8 | 20.6 | 2.6 | 5.8 | 0.30 | 10.71 | 1.38 | 1253 | 0.181 |
| 5b | 0.30 | -0.05 | -0.61 | 4.3 | 13.0 | 17.3 | 3.0 | 4.3 | 0.33 | 9.80 | 1.33 | 1249 | 0.150 |
| 5c | 0.36 | -0.06 | -0.60 | 3.9 | 11.8 | 15.7 | 3.0 | 3.9 | 0.36 | 9.04 | 1.31 | 1246 | 0.131 |
| 5d | 0.40 | -0.03 | -0.59 | 3.5 | 11.2 | 14.7 | 3.2 | 3.5 | 0.34 | 8.41 | 1.33 | 1252 | 0.112 |
| 5e | 0.45 | -0.05 | -0.60 | 3.1 | 10.5 | 13.6 | 3.4 | 3.1 | 0.35 | 8.06 | 1.30 | 1250 | 0.078 |
| 5f | 0.50 | -0.01 | -0.60 | 2.9 | 9.5 | 12.4 | 3.3 | 2.9 | 0.56 | 7.55 | 1.26 | 1255 | 0.049 |
| 6a | 0.36 | -0.01 | -0.20 | 3.9 | 11.9 | 15.8 | 3.1 | 3.9 | 0.32 | 8.94 | 1.33 | 1248 | 1.03 |
| 6b | 0.36 | -0.05 | -0.31 | 4.0 | 11.9 | 15.9 | 3.0 | 4.0 | 0.30 | 8.90 | 1.34 | 1245 | 0.67 |
| 6c | 0.36 | -0.03 | -0.38 | 4.0 | 11.9 | 15.9 | 3.0 | 4.0 | 0.31 | 8.95 | 1.33 | 1255 | 0.37 |
| 6d | 0.36 | -0.04 | -0.52 | 4.0 | 11.9 | 15.9 | 3.0 | 4.0 | 0.33 | 8.95 | 1.33 | 1252 | 0.209 |
| 6e (=5c) | 0.36 | -0.05 | -0.60 | 3.9 | 11.8 | 15.7 | 3.0 | 3.9 | 0.35 | 9.04 | 1.31 | 1246 | 0.131 |
| 6f | 0.36 | -0.03 | -0.65 | 3.9 | 11.8 | 15.7 | 3.0 | 3.9 | 0.34 | 8.98 | 1.31 | 1249 | 0.083 |

*FIG. 6*

OPTICAL FIBER

The contents of the following Japanese patent application are incorporated herein by reference: NO. 2012-091106 filed on Apr. 12, 2012.

BACKGROUND

1. Technical Field

The present invention relates to an optical fiber used for optical communication, and in particular to an optical fiber suitable for use as wiring of long distance lines for transmission over a length of tens of kilometers and as wiring in an optical fiber to the home (FTTH) or local area network (LAN) inside or outside of the home.

2. Related Art

Optical fiber is used in the field of long-distance communication, due to its bandwidth characteristics, and is widely used in communication via long-distance backbone cables with lengths of tens of kilometers or more. On the other hand, the amount of information exchanged between individual personal computers has increased drastically due to the quick spreading of the Internet. The communication paths that have become widely used are copper wire electrical cables, such as coaxial cables and unshielded twisted pair (UTP) cables. However, electrical cables have narrow bandwidth and are easily affected by electromagnetic noise, and it is therefore difficult to transfer a large amount of information through the electrical cables.

Accordingly, optical fiber is used not only for long distance communication between phone stations, but also for communication between phone stations and each user, and FTTH has become widely used as a technique for increasing the transmission capacity. The FTTH system utilizes the wideband characteristic of optical fiber to share a single optical fiber among a plurality of users at a point near a user group. After this, optical signals are branched to each user and optical fiber drop wires are distributed to each user.

Curvature loss is one important characteristic that is desired for optical fiber within home wiring or drop lines. Since a long distance backbone cable is arranged in a location that is not easily affected by outside forces, e.g. in an underground duct, the bending force placed on these optical fibers is expected to result from no more than wrapping the optical fiber (up to 100 times) with a diameter of 60 mm within a terminal device.

In contrast to this, although the optical fiber inside and outside a home can bend and is light-weight, the optical fiber is easily affected by outside forces and often experiences a curvature radius of 20 mm or less. The optical fiber propagates the signal light through the core of the optical fiber. Therefore, transmission is still possible when the optical fiber is in a curved state. However, when the curvature radius is smaller, the ratio of light that leaks out of the core without being propagated increases exponentially, resulting in transmission loss. This is referred to as "curvature loss."

Focusing more of the light in the core is effective for reducing the curvature loss, and this effect can be improved by lowering the mode field diameter (MFD). Therefore, optical fiber with an MFD of approximately 6 to 8 µm is often used, in which case the curvature loss when the optical fiber is wrapped around a mandrel (cylinder) with a diameter of 20 mm is no greater than 0.5 dB/turn for a wavelength of 1550 nm.

A trench-type optical fiber that can lower the curvature loss while employing a design with high MFD is described in U.S. Pat. No. 4,852,968 and in the technical document "Optical Fiber Comprising a Refractive Index Trench" by William A. Reed. This technique has been known for a long time, but these excellent curvature loss characteristics have recently attracted a lot of attention. In the case of a quartz glass optical fiber, the core is doped with germanium to increase the refractive index and the trench portion is doped with fluorine to decrease the refractive index. Inner and outer cladding is formed by pure quartz or is doped with only a small amount of fluorine or germanium, thereby bringing the refractive index of the cladding near that of quartz.

When manufacturing a normal optical fiber base material using VAD, (1) a core (first core) and inner cladding (second core) are formed, to create a core/cladding glass intermediate body (intermediate body). Next, (2) the trench portion (third core) is formed. This is achieved by placing the intermediate body in a fluorine-doped glass tube, prepared separately. Instead, the trench portion can be formed by carefully blowing the outside of the intermediate body with glass soot microparticles, and thermally processing the resulting material in an atmosphere of a gas containing fluorine. Finally, (3) the outer cladding is formed.

Here, the problem is that impurities, such as OH groups, are easily mixed in near the interface between the intermediate body and the trench. When a large amount of OH groups are mixed in the path through which light travels in the optical fiber, an optical absorption peak occurs due to the OH groups at a wavelength of 1383 nm. As a result, the trench-type optical fiber manufactured in this way has high transmission loss at 1383 nm due to the OH groups, and it is difficult to satisfy the ITU-T G652D standard.

In light of the prior art above, it is an objective of the present invention to provide an optical fiber that has few OH impurities and excellent curvature characteristics. In particular, concerning the OH impurities, the transmission loss at 1383 nm is no greater than 0.35 dB/km, which is the transmission loss at a normal communication wavelength of 1310 nm.

SUMMARY

In order to solve the above problems, according to a first aspect of the present invention, provided is an optical fiber comprising a first core at a center thereof, a second core that is adjacent to the first core and covers an outer circumference of the first core, a third core that is adjacent to the second core and covers an outer circumference of the second core, and a cladding that is adjacent to the third core and covers an outer circumference of the third core, wherein with a refractive index of the cladding as a reference, $\Delta 1$ is a maximum value of a relative refractive index difference of the first core, $\Delta 2$ is a maximum value of a relative refractive index difference of the second core, $\Delta 3$ is a minimum value of a relative refractive index difference of the third core, "a" is a half-value radial width for the relative refractive index difference $(\Delta 1 - \Delta 2)$ of the first core, "b" is a radius of a boundary between the second core and the third core, and "c" is a radius of a boundary between the third core and the cladding, the expressions $0.30\% \leq \Delta 1 \leq 0.45\%$, $-0.05\% \leq \Delta 2 \leq 0.05\%$, $-0.6\% \leq \Delta 3 \leq -0.3\%$, $2.85 \leq b/a$, $10 \, \mu m \leq b \leq 15 \, \mu m$, and $3 \, \mu m \leq c-b \leq 5.5 \, \mu m$ are satisfied, and transmission loss for a wavelength of 1550 nm when the optical fiber is wound around a mandrel with a diameter of 10 mm is no greater than 0.2 dB/turn.

BRIEF DESCRIPTION OF THE DRAWINGS

FIG. 2 is a table showing the manufacturing parameters and the optical characteristics for the 125-μm optical fibers formed as the first to fourth embodiments and the first to third comparative examples.

FIG. 6 is a table showing the manufacturing parameters and optical characteristics of 125-μm optical fibers manufactured as embodiments 5a to 5f and 6a to 6f.

DESCRIPTION OF EXEMPLARY EMBODIMENTS

Figure 1:
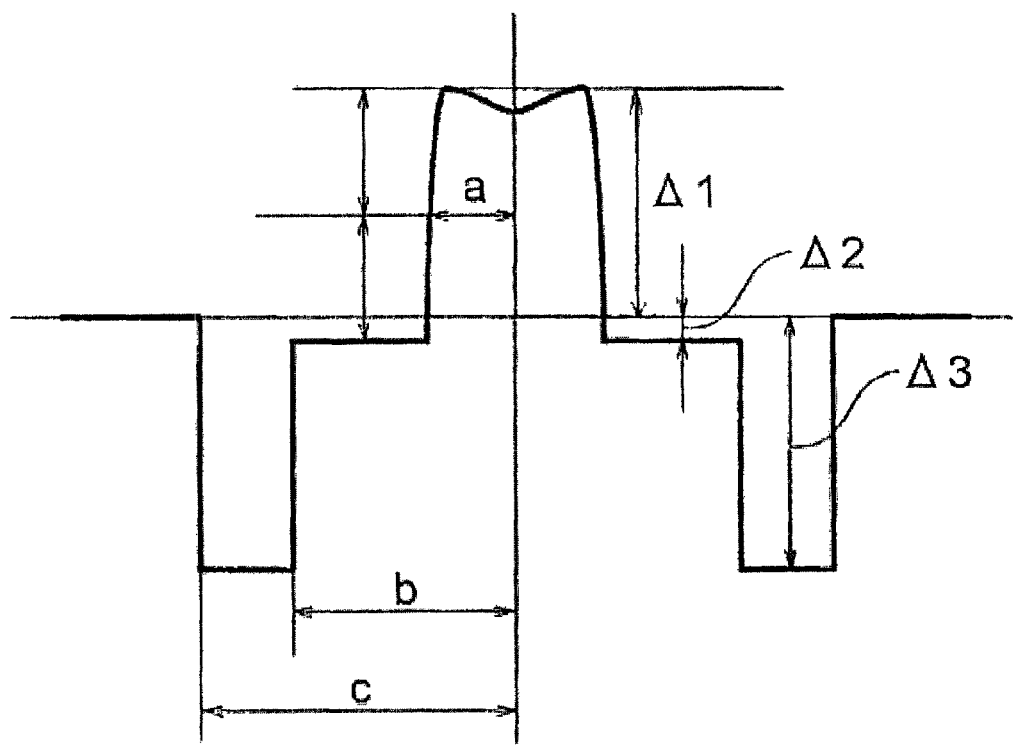
FIG. 1 is a schematic view showing a refractive index distribution of the optical fiber of the present invention.

The following describes first to fourth embodiments and first to third comparative examples for the optical fiber of the present invention, but the present invention is not limited to these examples, and can take on a variety of forms. A porous glass base material was formed by combining a first core and a second core, using VAD. The first core was doped with germanium to increase the refractive index. This porous glass material was heated to approximately 1200° C. in a chlorine gas atmosphere, the hydrogen groups (—OH groups) contained therein were removed, and the resulting material was heated to approximately 1600° C. in a helium gas environment, thereby forming a solid transparent glass core base material. This transparent glass core base material was elongated to have a prescribed diameter, using a glass lathe, and the prescribed outer diameter was achieved over the length thereof. At this time, OH groups are taken into the surface due to the effect of the oxyhydrogen flame of the glass lathe, but these OH groups were removed by washing the surface of the transparent glass core base material through submersion in a hydrogen fluoride solution after the elongation. Instead, an argon plasma flame may be used as the heating source of the glass lathe. In this case, OH groups are not mixed into the surface of the core base material, and therefore the process using the hydrogen fluoride solution can be omitted.

Next, silica glass microparticles were deposited on the transparent glass core base material using OVD, thereby forming the porous layer corresponding to the third core. This third core was heated to approximately 1200° C. in a chlorine gas atmosphere, the OH groups contained in the porous glass layer were removed, the refractive index of the glass was lowered by implanting fluorine in the porous glass layer through introduction of a silane tetrafluoride gas, and the resulting material was heated to approximately 1600° C. in a helium gas environment, thereby forming a transparent third glass core layer. Instead of silane tetrafluoride, another gas containing fluorine, such as methane tetrafluoride or ethane hexafluoride, can be used for this process.

The transparent core base material that is formed from the first core, the second core, and the third core in this way was inserted into a silica glass tube used for cladding, and heated to approximately 2000° C. while pressure inside the tube was decreased using a vacuum pump, thereby forming a transparent glass base material for use as an optical fiber in which the cladding and core portions are integrated. Not only is the transparent core base material inserted into the tube, but also a porous silica glass layer may be deposited on the outside of the transparent core base material using OVD and the resulting material may be heated to approximately 1600° C. in a helium gas atmosphere to perform transparent vitrification.

A plurality of different optical fiber base materials were formed by changing the diameter and thickness of the first core, the second core, and the third core and changing the amount of the fluorine dopant included in the third core and the amount of germanium dopant included in the first core. The optical fiber base material manufactured in this way was heated to approximately 2100° C. and spun to obtain optical fibers with diameters of 125 μm as the first to fourth embodiments and the first to third comparative examples, as shown in FIG. 2. FIG. 2 is a table showing the manufacturing parameters and the optical characteristics for the 125-μm optical fibers formed as the first to fourth embodiments and the first to third comparative examples.

In this table, the transmission loss is a value measured for a wavelength of 1383 nm, and the curvature loss is a value measured for a wavelength of 1550 nm and a curvature diameter of 10 mm.

The second core and the cladding are manufactured from silica glass that does not contain germanium or fluorine, but Δ2 is not necessarily zero. There is usually a delta error of −0.05% to +0.05%. One of the reasons for this is the chlorine contained in the glass. The second core and cladding always include 1000 to 5000 ppm of chlorine (Cl) due to the effects of the raw material (silicon tetrachloride, for example) used when manufacturing the porous glass and the chlorine gas added during the process for removing the OH groups, for example. When there is 1000 ppm of Cl, the refractive index Δ increases by approximately 0.01%. Furthermore, one more reason for the delta error is the difference in residual straining caused by previous thermal processing, for example, and it is known that the refractive index increases when there is residual pressure strain.

In the first embodiment, the boundary surface between the second core and the third core is distanced from the first core, by adjusting the manufacturing parameters such that b/a=3.01. Therefore, approximately 1 ppm of OH groups are mixed in near the boundary between the second core and the third core due to the effect of the oxyhydrogen flame used during OVD, but these OH groups do not easily affect the propagated light, and therefore the transmittion loss due to the OH groups can be effectively decreased and a favorable optical fiber with a transmission loss of 0.301 dB/km for a wavelength of 1383 nm was obtained. The curvature loss when this optical fiber was wound around a mandrel with a diameter of 10 mm was 0.066 dB/turn for a wavelength of 1550 nm, which is a favorable value.

In the second embodiment, there is a relatively low value of b/a=2.85, but the transmission loss at a wavelength of 1383 nm is 0.342 dB/km, which is a level that does not cause problems in practice. Furthermore, by setting c−b=3.61 μm, the difference between the cable cutoff wavelength (λcc) measured for a 22-meter optical fiber and the cable cutoff wavelength (λc) measured for a 2-meter optical fiber was lowered to 86 nm.

In the third embodiment, by setting b/a=2.96 and c−b=3.60 µm, the value of λc−λcc was reduced to 60 nm. In this way, λc can be decreased to a value of 1284 nm, which is below 1310 nm, and the single mode operation at 1310 nm also becomes possible in a short optical fiber with a length of 2 meters.

In the fourth embodiment, by setting a large value of b/a=3.30 and setting c−b=4.81 µm, the value of λc−λcc becomes 155 nm and the curvature loss when the optical fiber is wound around a mandrel with a 10-mm diameter becomes 0.058 dB/turn for a wavelength of 1550 nm, which is a very favorable value.

In the first comparative example, there is a relatively low value of b/a=2.79, but since the MFD has a large value of 9.01, b/MFD=1.16. As a result, the transmission loss for a wavelength of 1383 is a large value of 0.722 dB/km. Furthermore, the curvature loss is a large value of 0.643 dB/turn.

In the second comparative example, b/a=3.00, but due to the effect of the large value Δ1=0.402%, b/MFD=1.25. Therefore, the transmission loss for a wavelength of 1383 nm is a high value of 0.666 dB/km. Furthermore, since there is a relatively high value of c−b=5.59 µm, λc−λcc also has a high value of 185 nm.

Figure 3:
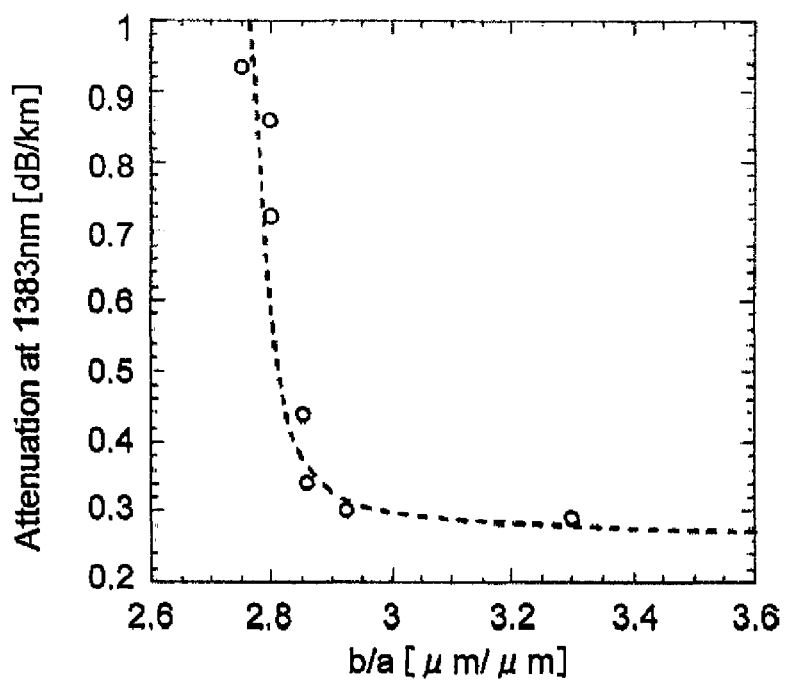
FIG. 3 is a graph showing a relationship between b/a and transmission loss for a wavelength of 1383 nm.
Figure 4:
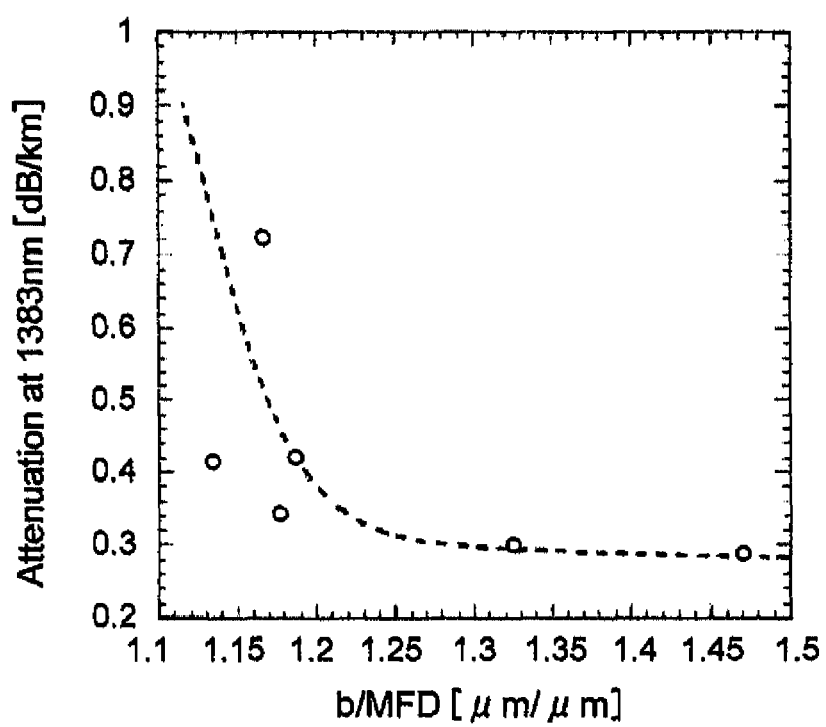
FIG. 4 is a graph showing a relationship between b/MFD and transmission loss for a wavelength of 1383 nm.

In the third comparative example, Δ3 was −0.25%. Therefore, the curvature loss reduction effect of the trench was weak, and the curvature loss had a high value of 0.326 dB/turn. Based on results from several test pieces, a correlation was seen with the transmission loss (b/a) or (b/MFD) for a wavelength of 1383 nm, and these relationships are shown in FIGS. 3 and 4.

Figure 5:
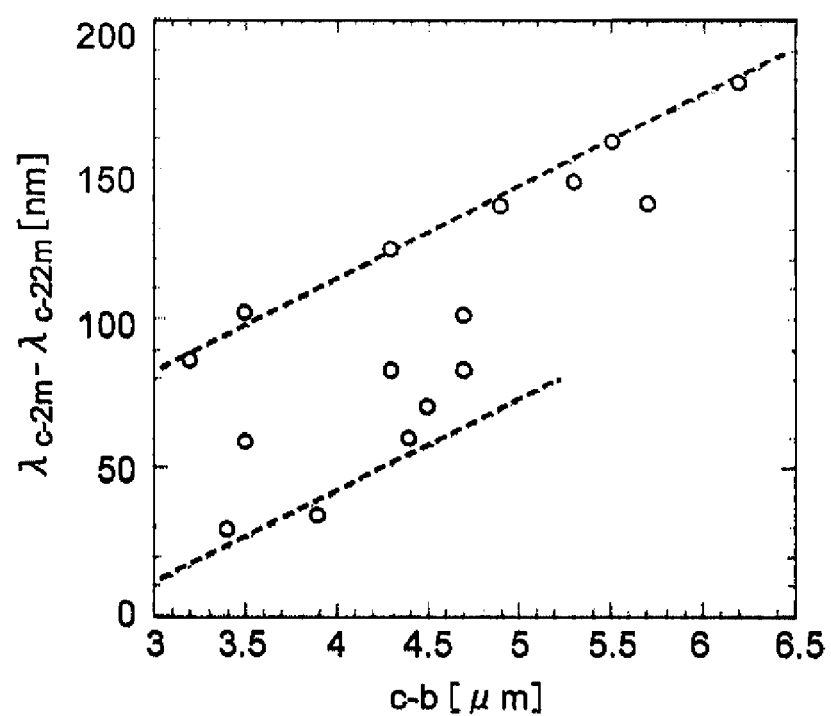
FIG. 5 is a graph showing a relationship between λc−λcc and c−b.

From the relationships, it is understood that, to achieve a transmission loss of 0.35 dB/km or less for a wavelength of 1383 nm, it is necessary that b/a≥2.85 or that b/MFD≥1.21. Furthermore, a correlation is seen between the value of λc−λcc and the value of c−b, and this relationship is shown as a graph in FIG. 5. In order to achieve a value for λc−λcc that is no greater than 70 nm to 160 nm, it is preferable that c−b≤5.5 µm. On the other hand, as shown by the first comparative example, when the value of c−b is too small, the curvature loss reduction effect of the trench is weak and the interface between the third core and the cladding, which is a region where OH groups easily focus, affects the propagated light, which worsens the transmission loss for a wavelength of 1383 nm. Therefore, it is preferable that c−b be at least 3 µm and, if possible, at least 3.5 µm.

Figure 7:
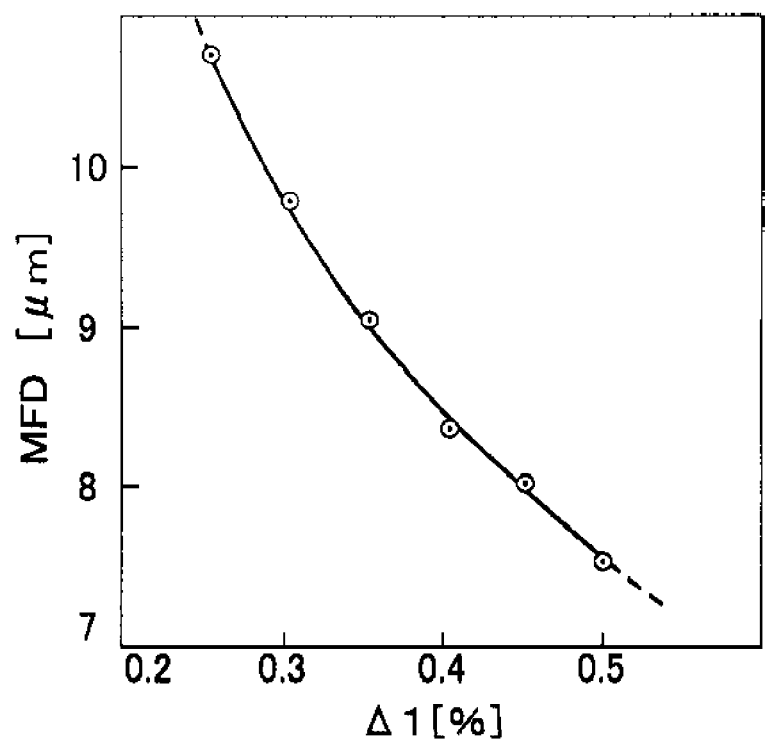
FIG. 7 is a graph showing the relationship between MFD and Δ1.
Figure 8:
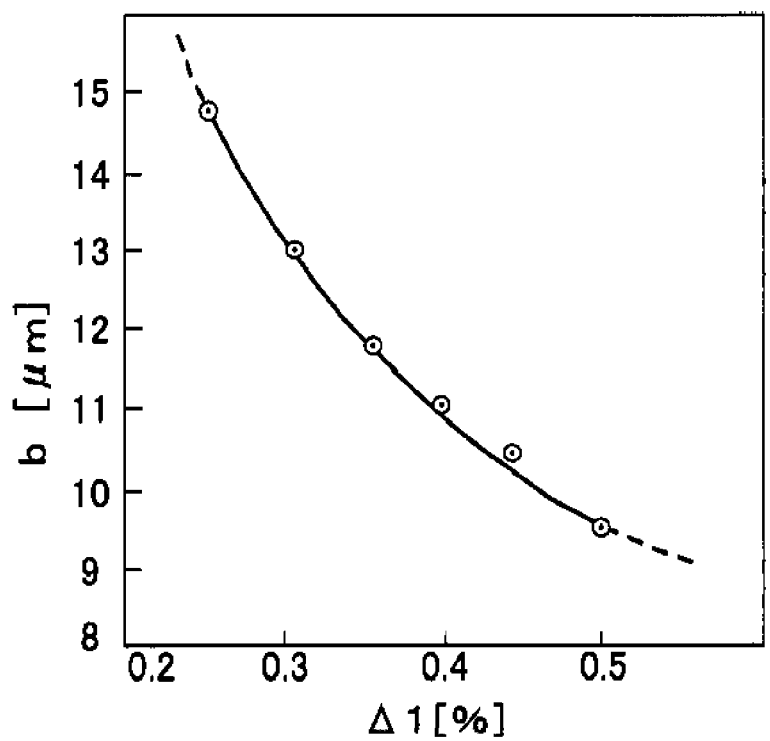
FIG. 8 is a graph showing the relationship between b and Δ1.
Figure 9:
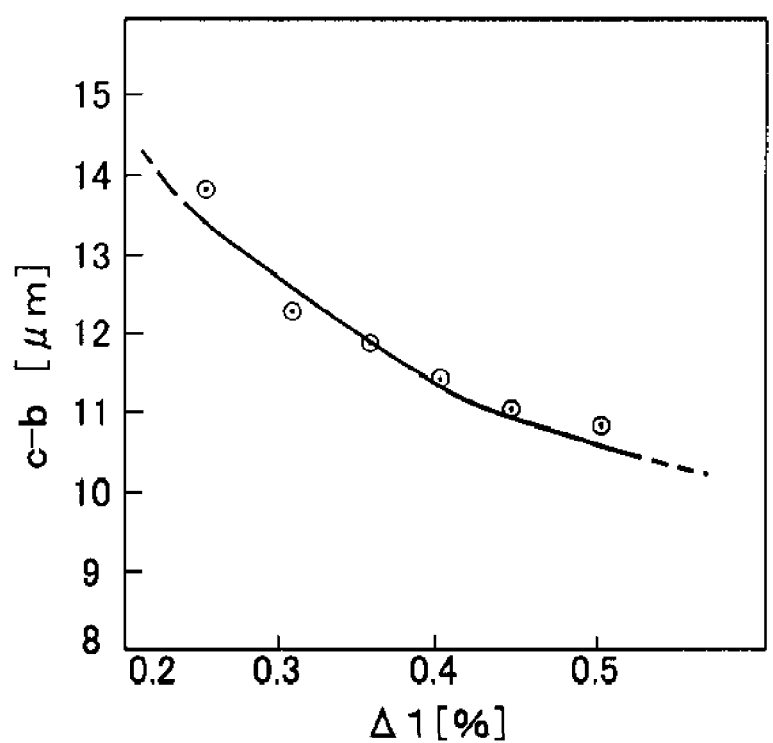
FIG. 9 is a graph showing the relationship between c−b and Δ1.

FIG. 6 is a table showing the manufacturing parameters and optical characteristics of 125-µm optical fibers manufactured as embodiments 5a to 5f and 6a to 6f. In the optical fibers according to embodiments 5a to 5f, Δ1 was changed when forming the base material such that λcc was adjusted to be approximately 1250 nm. Here, when matching the MFD with a value from 8.0 to 10.0 µm, which is a common optical characteristic value in a single mode optical fiber, it is necessary for Δ1 to be within a range from approximately 0.3% to 0.45%, as shown in FIG. 7. At this time, in order to adjust λcc, expansion and contraction of the core diameters a, b, and c was investigated, and it was found that b is approximately 10 to 15 µm and c−b is approximately 3 to 5.5 µm, as shown in FIGS. 8 and 9. The curvature loss characteristic in each of the optical fibers according to embodiments 5a to 5f was less than 0.2 dB/turn, which is a favorable value.

Figure 10:
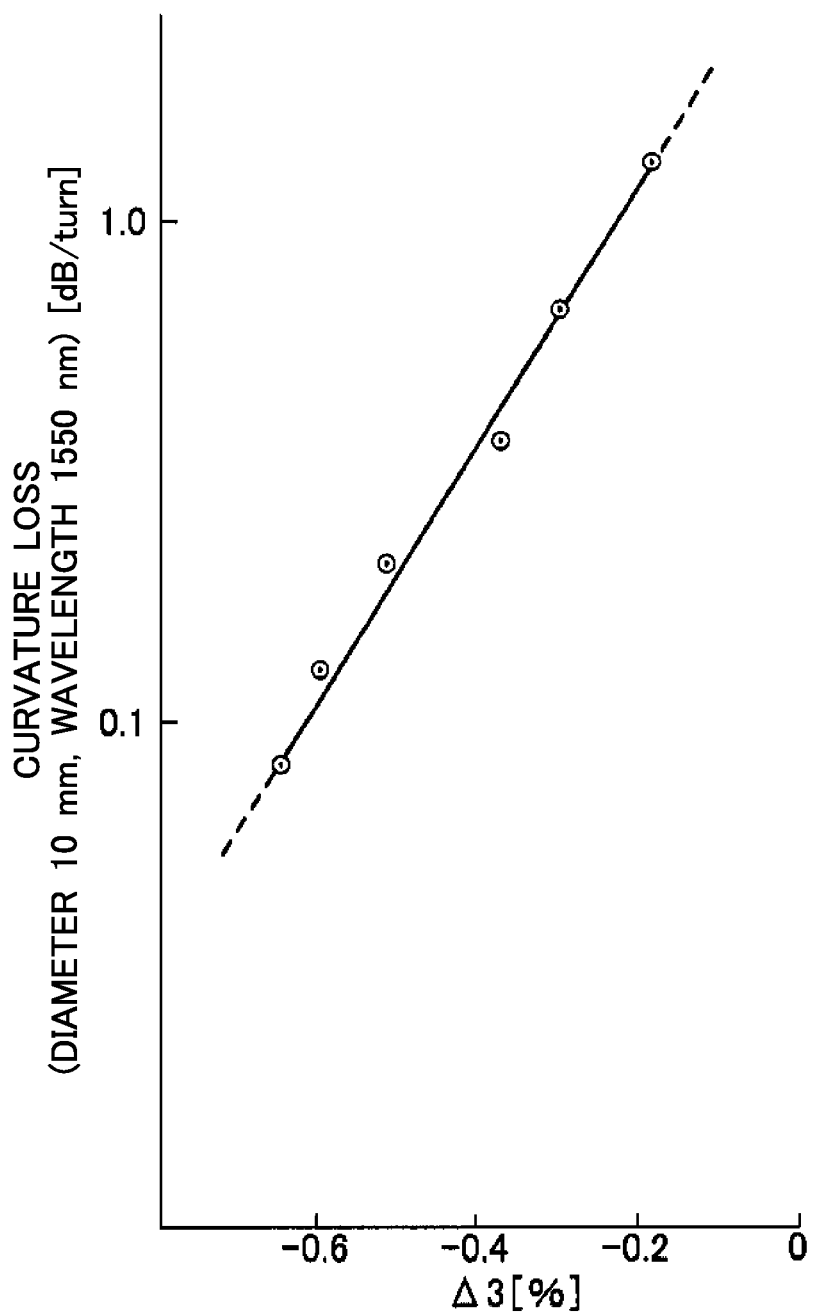
FIG. 10 is a graph showing the relationship between curvature loss (diameter of 10 mm, wavelength of 1550 nm) and Δ3.

In the optical fibers according to embodiments 6a to 6f, Δ3 was changed when forming the base material such that λcc was adjusted to be approximately 1250 nm. As shown in FIG. 10, when Δ3 is smaller, the curvature loss tends to be smaller as well. By setting Δ3≤−0.3%, the curvature loss can be kept at 1 dB/turn or less, and by setting Δ3<0.5%, the curvature loss can be made less than 0.2 dB/turn.

In embodiment 6f, Δ3=−0.65%, but when the Δ3 value is this low, there is a manufacturing problem that air bubbles occur easily in the boundary portion between the third core and the cladding. These air bubbles are believed to occur due to the heating of the fluorine mixed in as a dopant during the manufacturing process. Therefore, the minimum desirable value for Δ3 can be said to be approximately −0.6%.

The optical fiber of the present invention described above comprises a first core at a center thereof, a second core that is adjacent to the first core and covers an outer circumference of the first core, a third core that is adjacent to the second core and covers an outer circumference of the second core, and a cladding that is adjacent to the third core and covers an outer circumference of the third core, wherein with a refractive index of the cladding as a reference, Δ1 is a maximum value of a relative refractive index difference of the first core, Δ2 is a maximum value of a relative refractive index difference of the second core, Δ3 is a minimum value of a relative refractive index difference of the third core, "a" is a half-value radial width for the relative refractive index difference (Δ1−Δ2) of the first core, "b" is a radius of a boundary between the second core and the third core, and "c" is a radius of a boundary between the third core and the cladding, the expressions 0.30%≤Δ1≤0.45%, −0.05%≤Δ2≤0.05%, −0.6%≤Δ3≤−0.3%, 2.85≤b/a, 10 µm≤b≤15 µm, and 3 µm≤c−b≤5.5 µm are satisfied, transmission loss for a wavelength of 1550 nm when the optical fiber is wound around a mandrel with a diameter of 10 mm is no greater than 0.2 dB/turn, and a mode field value of an LP01 mode for a wavelength of 1310 nm is no less than 8 µm and no greater than 10 µm. Furthermore, "b" is 1.21 times or more greater than a mode field diameter, and transmission loss for a wavelength of 1383 nm is no greater than 0.35 dB/km. As a result, the boundary position (b) can be suitably far from the core, and the effect of OH groups that are prone to being mixed in at the boundary portion can be decreased, thereby decreasing the transmission loss near a wavelength of 1383 nm to be no greater than 0.35 dB/km.

In addition, in the optical fiber of the present invention, a cable cutoff wavelength measured for a 22-m optical fiber as defined by an ITU-T G.650 standard is no greater than 1260 nm, and is preferably no greater than 1260 nm for other standards as well. Furthermore, a fiber cutoff wavelength is no greater than 1420 nm, preferably no greater than 1310 nm, a cable cutoff wavelength is no greater than 1260 nm, a difference between a fiber cutoff wavelength and a cable cutoff wavelength is no greater than 160 nm, preferably no greater than 70 nm, and the optical fiber can substantially function as in single mode operation for a wavelength of 1310 nm by causing the fiber cutoff wavelength to be no greater than 1310 nm. Furthermore, by decreasing the difference in the cutoff wavelengths between 2-m optical fibers and 22-m optical fibers, single mode operation can be ensured even for short optical fibers of 22 meters or less, which are mainly used for wiring in homes.

In this way, with the optical fiber of the present invention, by distancing the core from the boundary position between the trench portion and the inner portion, an optical fiber can be obtained that has few OH impurities and excellent curvature characteristics.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An optical fiber comprising a first core at a center thereof, a second core that is adjacent to the first core and covers an outer circumference of the first core, a third core that is adjacent to the second core and covers an outer circumference of the second core, and a cladding that is adjacent to the third core and covers an outer circumference of the third core, wherein with a refractive index of the cladding as a reference, $\Delta 1$ is a maximum value of a relative refractive index difference of the first core, $\Delta 2$ is a maximum value of a relative refractive index difference of the second core, $\Delta 3$ is a minimum value of a relative refractive index difference of the third core, "a" is a half-value radial width for the relative refractive index difference ($\Delta 1 - \Delta 2$) of the first core, "b" is a radius of a boundary between the second core and the third core, and "c" is a radius of a boundary between the third core and the cladding, the expressions $0.30\% \leq \Delta 1 \leq 0.45\%$, $-0.05\% \leq \Delta 2 \leq 0.05\%$, $-0.6\% \leq \Delta 3 \leq -0.3\%$, $2.85 \leq b/a$, $10\ \mu m \leq b \leq 15\ \mu m$, and $3\ \mu m \leq c - b \leq 5.5\ \mu m$ are satisfied, "b" is 1.21 times or more greater than a mode field diameter for a wavelength of 1310 nm, curvature loss for a wavelength of 1550 nm when the optical fiber is wound around a mandrel with a diameter of 10 mm is no greater than 0.2 dB/turn, and transmission loss for a wavelength of 1383 nm is no greater than 0.35 dB/km.

2. The optical fiber according to claim 1, wherein a mode field value of an LP01 mode for a wavelength of 1310 nm is no less than 8 μm and no greater than 10 μm.

3. The optical fiber according to claim 1, wherein a cable cutoff wavelength measured for a 22-m optical fiber as defined by an ITU-T G.650 standard is no greater than 1260 nm.

4. The optical fiber according to claim 1, wherein a fiber cutoff wavelength is no greater than 1420 nm.

5. The optical fiber according to claim 1, wherein a cable cutoff wavelength is no greater than 1260 nm.

6. The optical fiber according to claim 1, wherein a difference between a fiber cutoff wavelength and a cable cutoff wavelength is no greater than 160 nm.

* * * * *